(12) United States Patent
Ohki et al.

(10) Patent No.: US 6,554,041 B1
(45) Date of Patent: Apr. 29, 2003

(54) APPARATUS FOR MAKING RUBBER COMPONENT PARTS WITH CONVEYOR FOR UNVULCANIZED RUBBER TAPE

(75) Inventors: Masahiko Ohki, Toyota (JP); Takeshi Toyoshima, Toyota (JP); Norio Taniguchi, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/518,198

(22) Filed: Mar. 3, 2000

(30) Foreign Application Priority Data

Mar. 3, 1999 (JP) .............................. 11-055552

(51) Int. Cl.⁷ ..................... B29D 30/06; B29D 30/60
(52) U.S. Cl. ................ 156/397; 156/405.1; 156/406.4; 156/425; 156/446
(58) Field of Search ............................. 156/117, 130, 156/129, 397, 405.1, 406.4, 425, 446, 447, 415, 417

(56) References Cited

U.S. PATENT DOCUMENTS

| | | | |
|---|---|---|---|
| 3,223,572 A | * 12/1965 | Holloway et al. | .......... 156/397 |
| 3,455,764 A | 7/1969 | Bryant | |
| 3,523,854 A | 8/1970 | Cantarutti | |
| 3,779,834 A | 12/1973 | Appleby et al. | |
| 4,155,789 A | * 5/1979 | Wireman et al. | ........... 156/130 |
| 4,240,863 A | 12/1980 | Vinton | |
| 4,674,622 A | 6/1987 | Utsunomiya | |
| 4,871,409 A | * 10/1989 | Perkins | ..................... 156/405.1 |
| 4,909,878 A | * 3/1990 | Watanabe | ................. 156/405.1 |
| 5,293,795 A | 3/1994 | Osawa et al. | |
| 6,039,826 A | * 3/2000 | Okada | ......................... 156/117 |

FOREIGN PATENT DOCUMENTS

| | | |
|---|---|---|
| DE | 1216528 | 7/1957 |
| GB | 1152184 | 5/1969 |
| JP | 8192911 | 11/1996 |
| JP | 10193475 | 7/1998 |
| WO | 9805580 | 2/1998 |

* cited by examiner

*Primary Examiner*—Geoffrey L. Knable
(74) *Attorney, Agent, or Firm*—Birch, Stewart, Kolasch & Birch, LLP

(57) ABSTRACT

An apparatus for making rubber component parts such as tire rubber parts comprises: a tape maker for making an unvulcanized rubber tape which comprises an extruder for extruding unvulcanized rubber; a winding drum around which the unvulcanized rubber tape is wound into a rubber component part; a conveyor for conveying the unvulcanized rubber tape toward the winding drum which comprises a conveyor belt winding around rollers and having a right side on which the unvulcanized rubber tape is put; and a traverser for moving the conveyor belt in the axial direction of the winding drum.

17 Claims, 10 Drawing Sheets

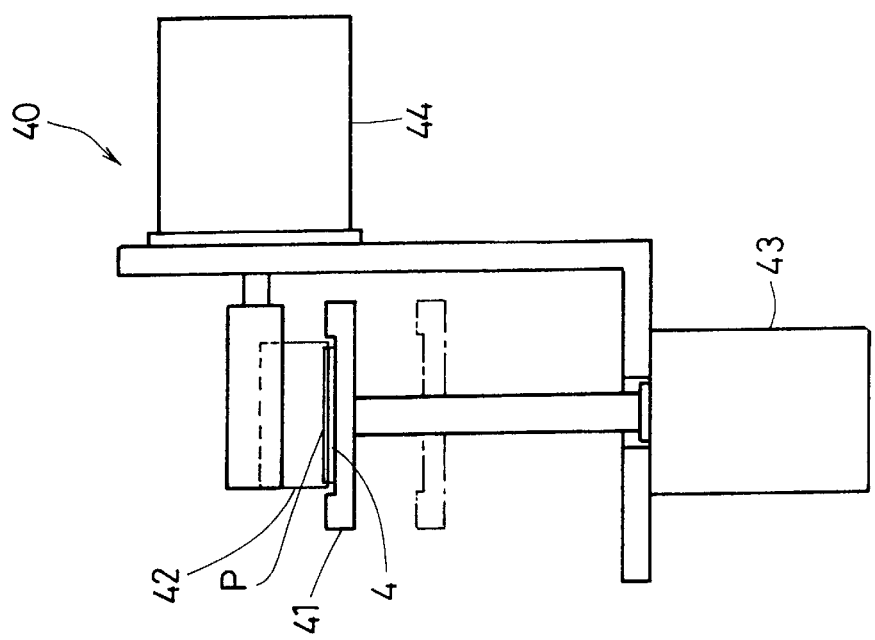
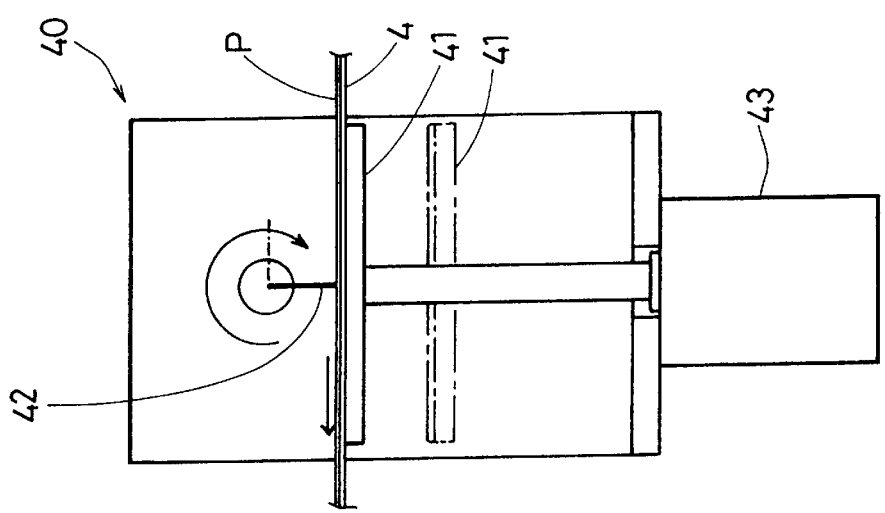

APPARATUS FOR MAKING RUBBER COMPONENT PARTS WITH CONVEYOR FOR UNVULCANIZED RUBBER TAPE

The present invention relates to an apparatus for making rubber component parts such as tire rubber component parts by winding an unvulcanized rubber tape, more particularly to a conveyor for the unvulcanized rubber tape.

In a pneumatic tire which is typical of rubber article, as shown in FIG. 11B, there are various rubber component parts (G) made of different rubber compounds, e.g. an inner liner rubber (Ga), sidewall rubber (Gb), chafer rubber (Gc), breaker cushion rubber (Gd), tread rubber (Ge), bead apex rubber (Gf) and the like.

Such rubber component parts (G) are conventionally made by means of an extruder or calender rollers in a form of rubber strip having the almost same width as the finished width or a wide rubber sheet cut into a rubber strip. Thus, the plant and equipment become inevitably large. On the other hand, as a tire is usually manufactured in various sizes, the total number of rubber component parts becomes very large, and accordingly it is necessary to prepare a large number of dies for the extruder. Further, it is necessary to change the facility when making a different type or size of tire. This takes much time. Therefore, in such a conventional method, it is difficult to establish a flexible manufacturing system which is capable of satisfying various marketing needs or demands, and it is also difficult to decrease investment in plant and machinery.

Recently, in a method of making a pneumatic tire, a method of making a rubber part was proposed, wherein a narrow rubber tape (P) is lap-wound into a final shape of the rubber part (G) as shown in FIG. 2 for example.

Therefore, an object of the present invention is to provide an apparatus for making rubber component parts, which is fit to use in such a lap-winding method and able to establish a flexible manufacturing system, while achieving downsizing of the plant and equipment and reductions in the investment in plant and machinery and the like.

According to one aspect of the present invention, an apparatus for making rubber component parts comprises:
- at least one tape maker for making an unvulcanized rubber tape, each tape maker comprising an extruder for extruding unvulcanized rubber;
- a winding drum around which the unvulcanized rubber tape is wound into a rubber component part;
- at least one conveyor for conveying the unvulcanized rubber tape toward the winding drum, each conveyor comprising a conveyor belt winding around rollers and having a right side on which the unvulcanized rubber tape is put and a reverse side; and
- at least one traverser for moving the conveyor belt in the axial direction of the winding drum.

Preferably, the right side of the conveyor belt is coated with a synthetic resin so that the unvulcanized rubber tape can be secured thereon by its self-bonding property during conveying, but does not stick thereto so as to be able to take it off therefrom when winding around the winding drum. Each conveyor preferably has an accumulator section in which the conveyor belt meanders for accumulating the unvulcanized rubber tape coming out from the tape maker, and the accumulator section having a variable capacity. Further, each conveyor has a swing section between the accumulator section and the traverser, in which the conveyor belt is twisted so that the widthwise direction of the conveyor belt is substantially at a right angle with respect to the traversing direction of the traverser.

Embodiments of the present invention will now be described in detail in conjunction with the accompanying drawings.

FIGS. 10A and 10B are diagrams for explaining a cutting means for the unvulcanized rubber tape.

According to the present invention, an apparatus 1 for making rubber component parts comprises at least one tape maker 3 for making a unvulcanized rubber tape P, a winding drum 5 around which the rubber tape P is wound, and at least one conveyor 2 for conveying the rubber tape P from the tape maker 3 to the winding drum 5.

Figure 11A:
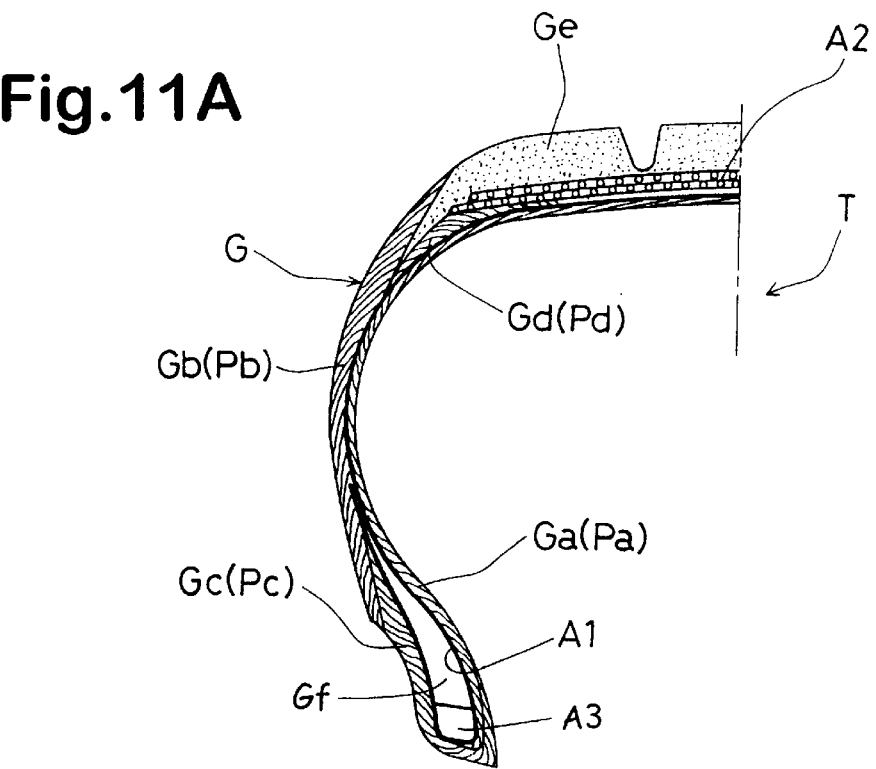
FIG. 11A is a cross sectional view of a pneumatic tire in which windings of the rubber tape in each tire rubber component part are depicted.
Figure 11B:
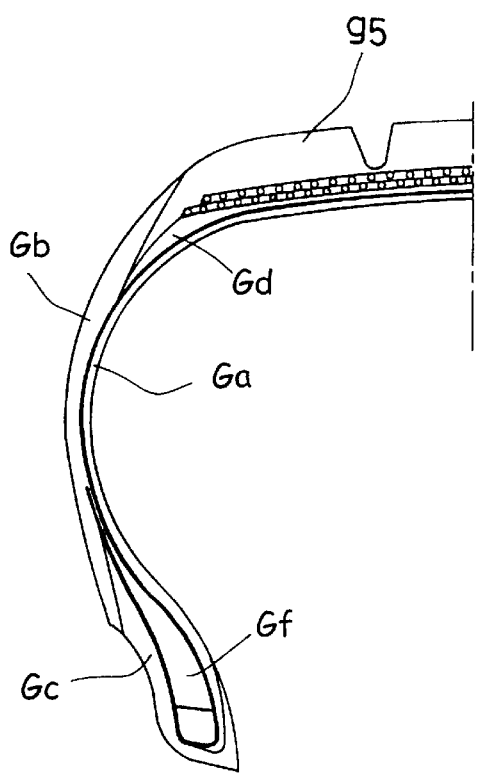
FIG. 11B is a cross sectional view of the same pneumatic tire.

In this embodiment, the apparatus 1 is incorporated in a manufacturing system for a pneumatic tire T. Incidentally, as shown in FIG. 11A, a pneumatic tire T comprises various rubber component parts G, e.g. inner liner rubber Ga, sidewall rubber Gb, chafer rubber Gc, breaker cushion rubber Gd, tread rubber Ge, bead apex rubber Gf and the like, and reinforcing members, e.g. cord plies such as a carcass A1 and belt (breaker) A2, and bead cores A3 and the like. Therefore, at least one of such tire rubber component parts G is formed by winding an unvulcanized rubber tape P.

The rubber tape P usually and preferably has a thickness of from 0.2 to 2.0 mm and a width of from 10 to 50 mm. But, it may be possible to set the sizes out of these ranges according to the final shape and size of the rubber component part G. On the other hand, as shown in FIGS. 1A–1F, the rubber tape P may have various cross sectional shapes, e.g. rectangle, trapezoid, rhombus and the like, and a fin or thinner portion may be provided along each edge (FIG. 1B, FIG. 1E) or one edge (FIG. 1F) of the tape.

Figure 1A:
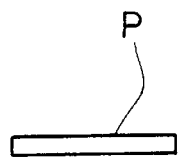
FIGS. 1A–1F show cross sectional shapes of examples of the unvulcanized rubber tape.
Figure 1B:
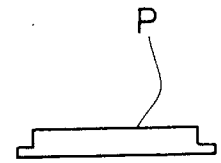
Figure 1C:
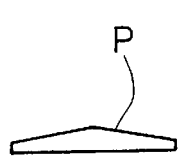
Figure 1D:
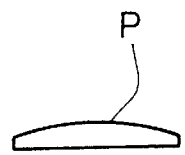
Figure 1E:
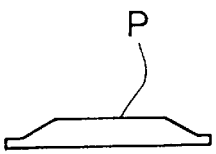
Figure 1F:
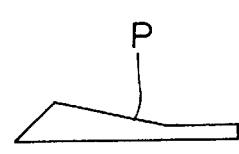
Figure 2:
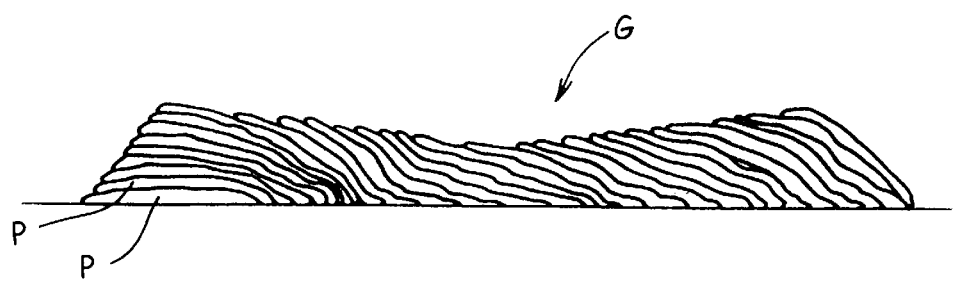
FIG. 2 is a cross sectional view for explaining a rubber tape wound in to a specific shape of a rubber component part.
Figure 3:
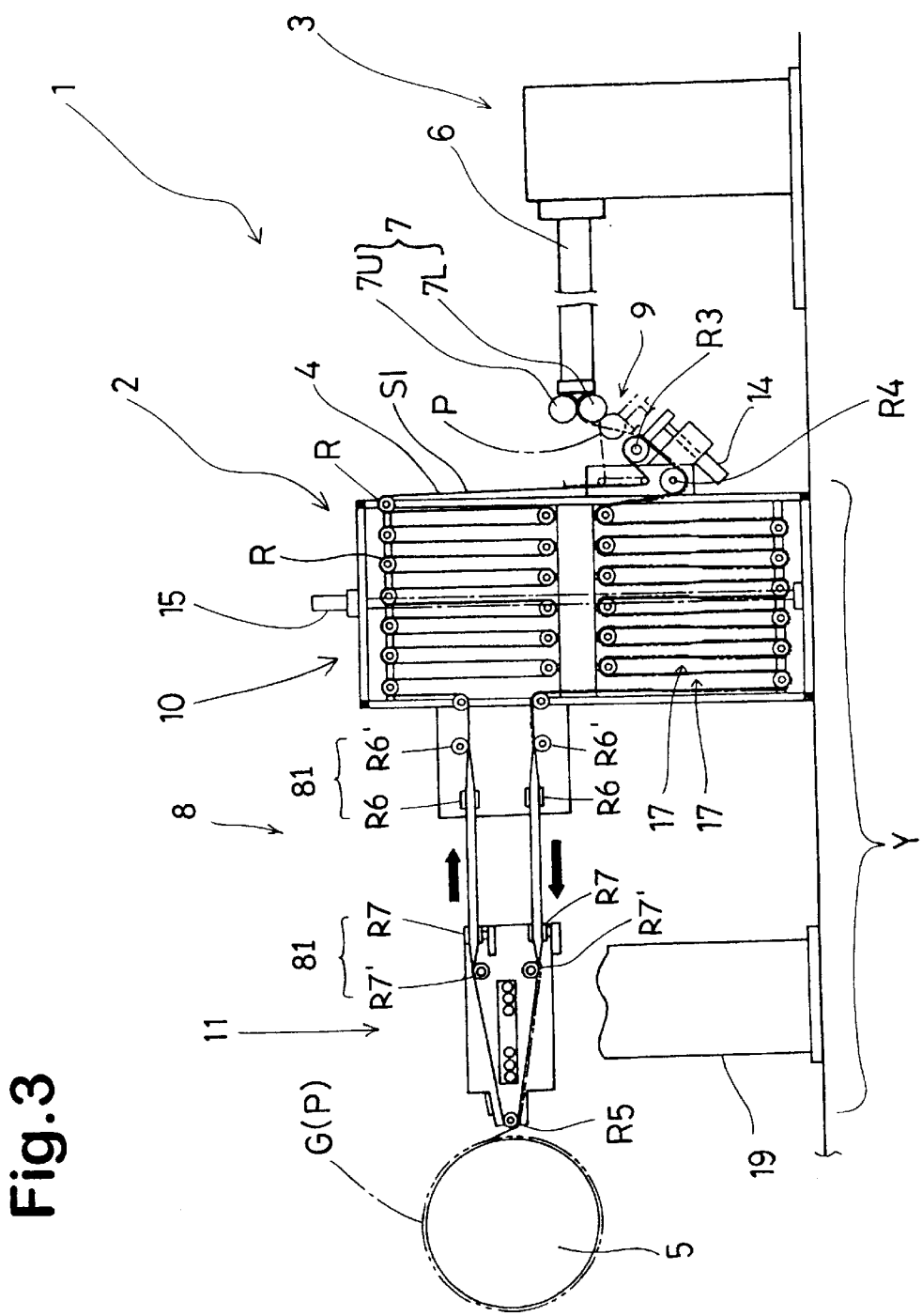
FIG. 3 is a schematic side view for explaining an apparatus for making rubber component parts according to the present invention.
Figure 4:
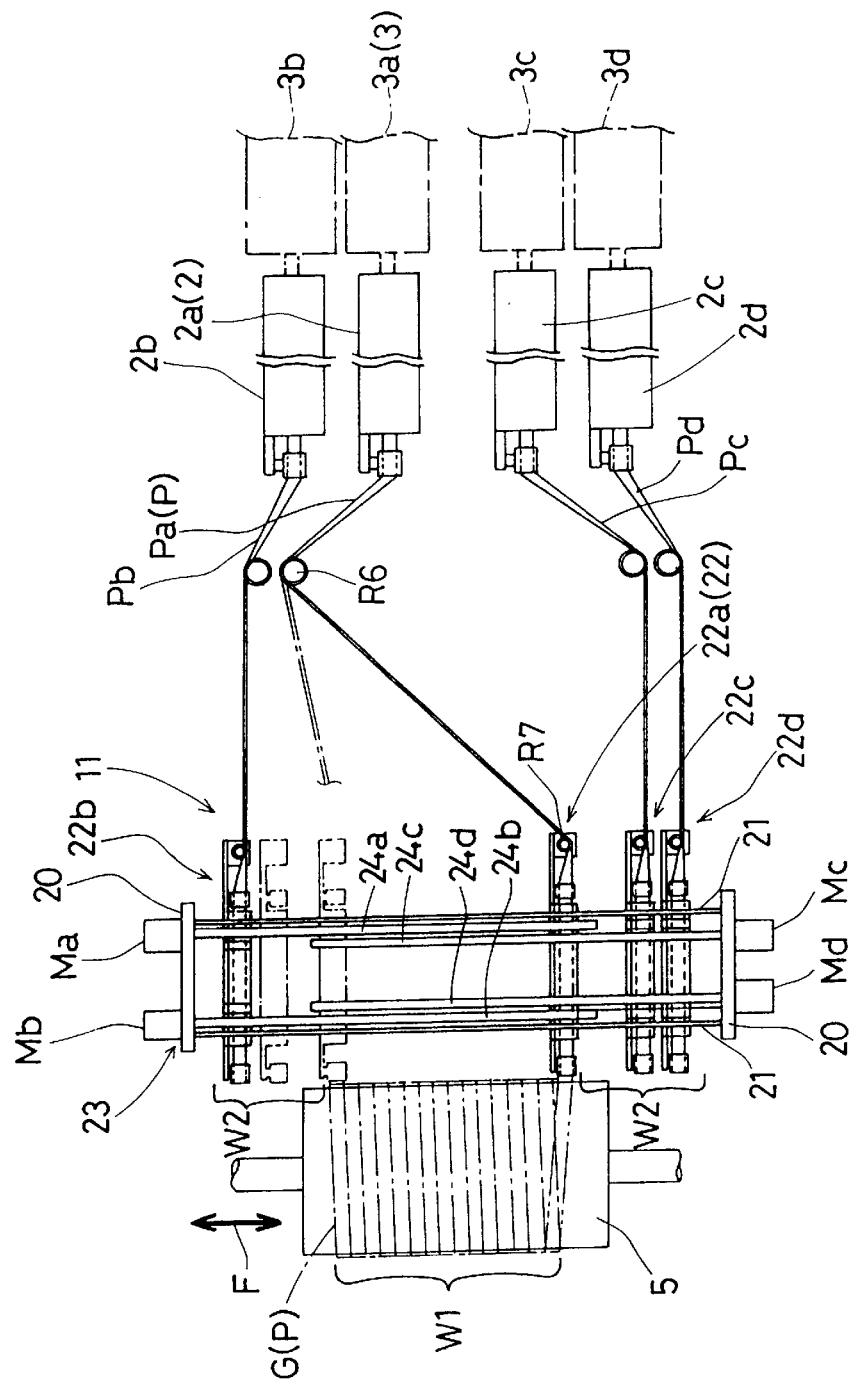
FIG. 4 is a schematic plan view thereof.

As shown in FIG. 3 and FIG. 4, the apparatus 1 in this embodiment comprises plural sets, for example four sets of a tape maker 3 (3a–3d) and a conveyor 2 (2a–2d) so as to be able to supply and wind plural rubber tapes P made of different compounds at the same time.

The tape maker 3 comprises an extruder 6 for extruding unvulcanized rubber and a pair of counterrotating compression rollers 7U and 7L.

The extruder 6 is provided in its main body with a screw for mixing rubber materials put in the main body and pushing the compounded rubber towards a die. The die is disposed at the front end of the main body and having an extruding hole from which the rubber is extruded. In this example, the shape of the extruding hole is a rectangle independently of the cross sectional shape of the rubber tape P.

The compression rollers 7U and 7L are disposed such that the axes thereof are parallel with each other and a gap is formed therebetween in order to compress and shape the extruded rubber into a form of tape having a specific cross sectional shape as explained above. The shape of the gap is similar to but somewhat smaller than the target cross sectional shape of a rubber tape P. In this example, the compression rollers 7U and 7L are disposed near and upward and downward of the extruding hole of the die to receive the extruded rubber directly from the extruder 6, and the axes of the upper roller 7U and lower roller 7L are substantially horizontal so that the widthwise direction of the rubber tape P coming out therefrom becomes substantially horizontal. In case of a cross section having a flat base as shown in FIG. 1A–FIG. 1F, one of the compression rollers 7U and 7L, in this example the upper compression roller 7U, has a straight configuration. And the configuration of the other roller 7L is changed according to the cross sectional shape of the rubber tape P.

The above-mentioned drum 5 can rotate around its axis by means of a computer controlled rotary actuator such as electric motor. The axis is substantially horizontal, and the drum 5 may have a specifically profiled surface or a simple surface of a constant diameter, around which the rubber tape P is wound as the drum rotates. In this embodiment, the drum 5 is a tire building drum which is expandable from a cylindrical shape to a barrel-like specific shape.

The drum 5 is situated at a distance from the tape maker 3, and the conveyor 2 is dispose therebetween.

The conveyor 2 comprises an endless conveyor belt 4 which loops between the tape maker 3 and the drum 5, and various rollers R for guiding and/or driving the conveyor belt 4.

The conveyor belt 4 is made of a nonextensible material (in this example polyester) and has a right side S1 and a reverse side S2. At least the right side S1 is coated with a synthetic resin (in this example a polyurethane resin) to obtain a proper adhesion to the unvulcanized rubber tape P. It is also possible to coat the reverse side S2 with the same resin.

Thus, the rubber tape P can be held on the right side S1 of the conveyor belt 4 by the self-bonding property of the tape P itself.

The conveyor 2 is made up of the following functionally different sections: a rubber-tape receiving section 9; an accumulator section 10 wherein the conveyor belt 4 meanders; a traverser section 11 wherein the conveyor belt 4 can move in the axial direction F of the drum 5 (or traversing direction); and a swing section 8 between the accumulator section 10 and traverser section 11 wherein the conveyor belt 4 is twisted so that the widthwise direction thereof becomes generally crosswise to the traversing direction.

The accumulator section 10 includes a rubber-tape accumulator 10A for the rubber tape P and optionally a conveyor-belt accumulator 10B for the conveyor belt 4 returning from the drum 5.

Figure 5:
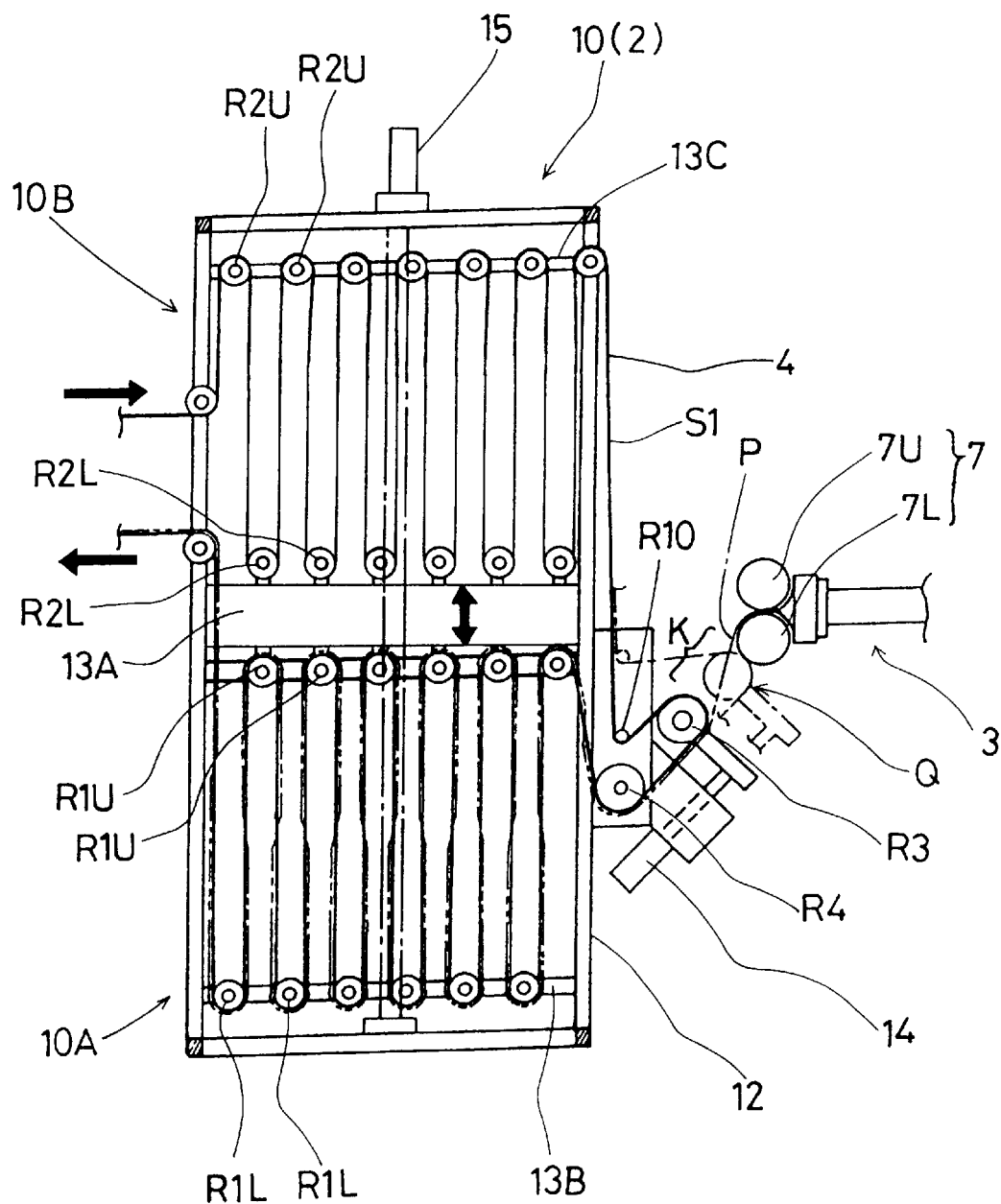
FIG. 5 is a schematic side view for explaining an accumulator section of a conveyor for the unvulcanized rubber tape.
Figure 6:
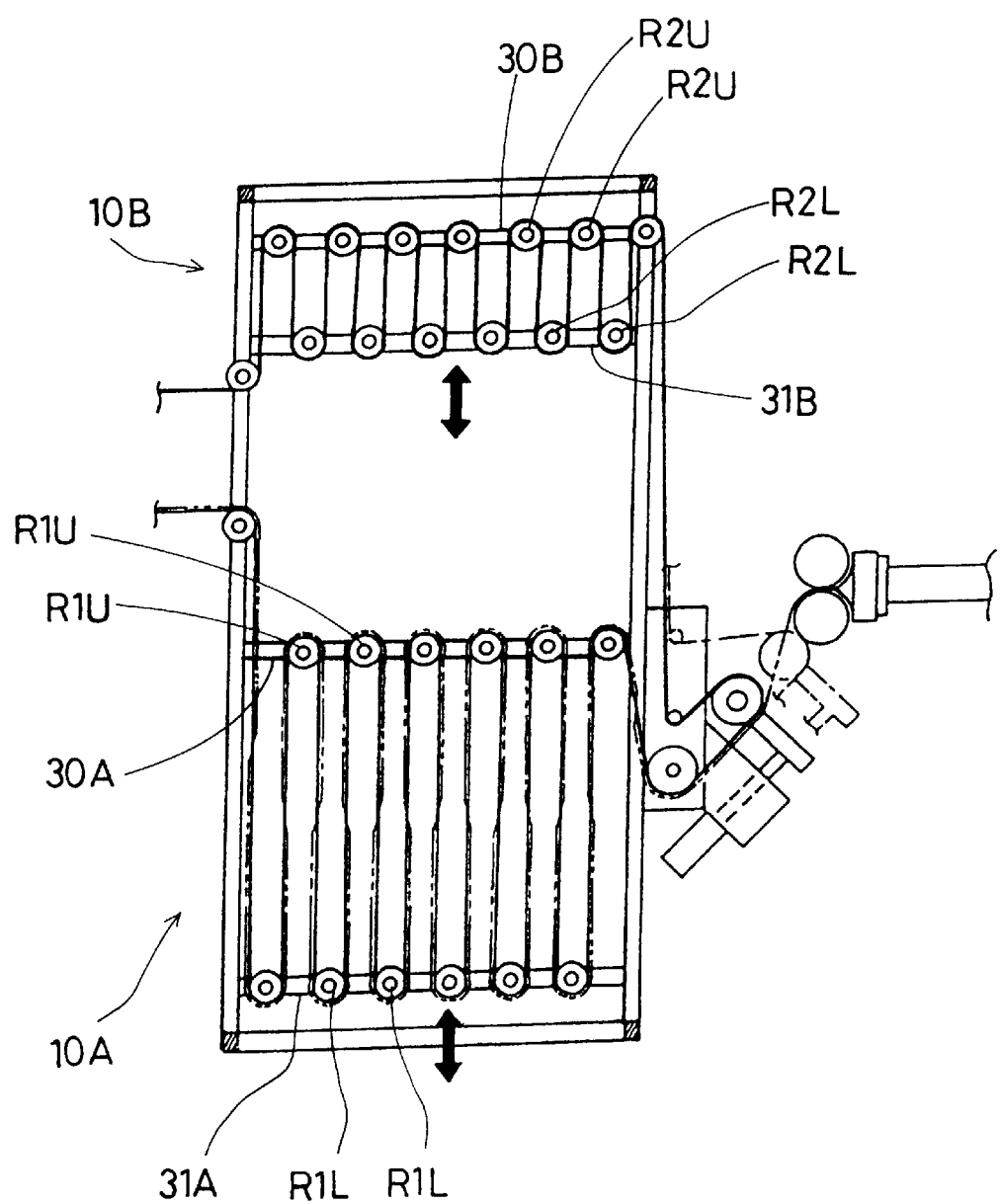
FIG. 6 is a schematic side view for explaining another example of the accumulator section.
Figure 7:
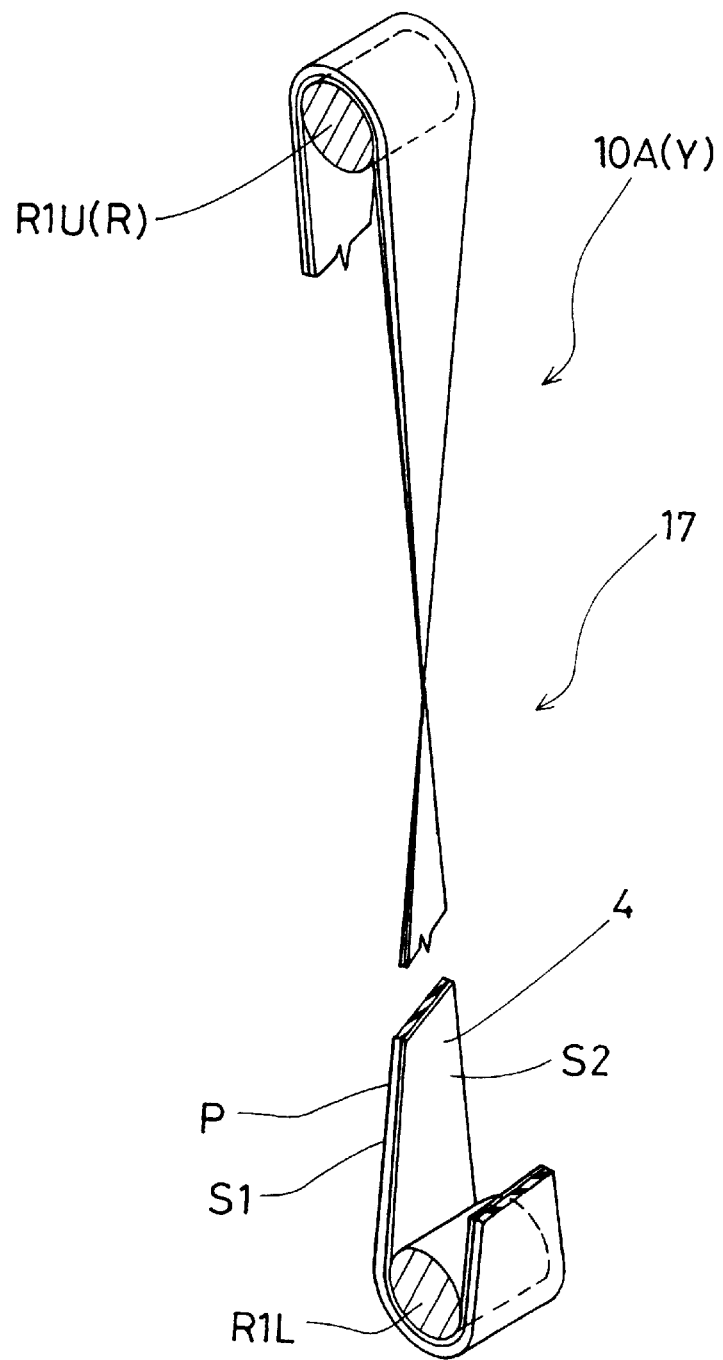
FIG. 7 is a schematic perspective view showing a twisted portion of a conveyor belt of the conveyor.

FIG. 5 and FIG. 6 each schematically show an example of the accumulator section 10.

In the rubber-tape accumulator 10A, the conveyor belt 4 winds zigzag between upper free guide rollers R1U and lower free guide rollers R1L. Similarly, in the conveyor-belt accumulator 10B, the conveyor belt 4 winds zigzag between upper free guide rollers R2U and lower free guide rollers R2L.

In the example shown in FIG. 5, the lower guide rollers R1L are fixed to a fixed frame member 13B of a main frame 12 in a horizontal line, and the upper guide rollers R2U are fixed to a fixed frame member 13C of the main frame 12 in a horizontal line. But the upper guide rollers R1U are fixed to a movable frame member 13A in a horizontal line and the lower guide rollers R2L are also fixed to the same movable frame member 13A in a horizontal line. The number of the upper guide rollers R1U is equal to the number of the lower guide rollers R2L. The movable frame member 13A is supported by a linear motion guide fixed to the main frame 12 and can move in the vertical direction by means of a computer controlled electric motor 15. Accordingly, when the frame member 13A moves upward, the accumulation in the rubber-tape accumulator 10A increases, but the accumulation in the conveyor-belt accumulator 10B decreases. On the other hand, when the frame member 13A moves downward, the accumulation in the rubber-tape accumulator 10A decreases, but the accumulation in the conveyor-belt accumulator 10B increases. The amount of increase is equal to the amount of decrease in anytime.

In the example shown in FIG. 6, the upper guide rollers R1U are fixed to a fixed frame member 30A of a main frame 12 in a horizontal line, and the upper guide rollers R2U are fixed to a fixed frame member 30B of the main frame 12 in a horizontal line. But the lower guide rollers RIL are fixed to a movable frame member 31A in a horizontal line, and the lower guide rollers R2L are also fixed to a movable frame member 31B in a horizontal line. The movable frame members 31A and 31B are respectively supported by linear motion guides, which are for example fixed to the main frame 12, movably in the vertical direction, and a downward force is applied to the frame members 31A and 31B individually utilizing its own weight, and/or a spring means. In order to aid the upward and downward motion of the frame member 31A, 31B, a pressure cylinder 15 and the like may be used, but in this example, such active means is not used. Therefore, according to the difference in the length of the conveyor belt between pull-out by the drive rollers and entering into the accumulator section, the movable frame members 31A and 31B move to change the accumulation.

The consumption rate of the rubber tape P in the winding drum 5 varies wide. The rubber-tape accumulator 10A can absorb such variation. Therefore, the tape maker 3 can produce the rubber tape P at almost constant production rate. As a result, stability of the cross sectional shape and dimensions of the tape can be improved. Further, it becomes unnecessary to extrude a mass of rubber in a short time. Thus, a relatively small extruder can be used, which also helps to render the facility size small. Further, the rubber-tape accumulator 10A is provided near the extruder 6 and functions as a cooler for the extruded unvulcanized rubber, whereby the rubber tape P cools down before wound and dimensional stability of the rubber component can be improved.

The rubber-tape receiving section 9 is provided on the tape-maker side of the accumulator section 10. This section 9 includes a receive roller R3 around which the conveyor belt 4 coming out from the accumulators 10A and 10B loops. The receive roller R3 can shift from a normal position to a pick-up position Q to pick up the rubber tape P from the compression roller 7L onto the conveyor belt 4. At the normal position, the conveyor belt 4 is at a certain distance from the lower compression roller 7L, but at the pick-up position Q, the conveyor belt 4 substantially contacts with the lower compression roller 7L. In order to ensure the picking-up, adhesion to the rubber tape P is adjusted such that the lower compression roller 7L is smaller than the conveyor belt 4 but larger than the upper compression roller 7U. As a means 14 for shifting the receive roller R3, a reciprocating means such as pressure cylinder, a tilting means utilizing a rotary actuator, and the like may be used. In this embodiment, a reciprocating means is used.

Further, downstream of the receive roller R3, a drive roller R4 is disposed. The drive roller R4 can move the conveyor belt 4 continuously at a substantially constant speed when the tape maker 3 is producing the rubber tape P.

The above-mentioned traverser section 11 includes a traverser 22 confronting the surface of the drum 5 on which the rubber tape P is wound. The traverser 22 is supported by a pair of parallel guide shafts 21 movably therealong. The guide shafts 21 extend in parallel to the axial direction F of the drum 5 and the traverser 22 can traverse the winding area W1 of the drum 5.

In this embodiment, the traversers 22a–22d of all the conveyors 2a–2d are supported by the same guide shafts 21 of which ends are fixed to side plates 20 standing on a table 19.

Each traverser 22 (22a–22d) is moved by a reciprocating means 23 individually. In this embodiment, a ball screw is utilized. Thus, the reciprocating means 23 comprises a ball nut mounted on the traverser 22 (22a–22d), a screw shaft 24 (24a–24d) engaging with the ball nut, and a computer controlled electric motor M (Ma–Md) for rotating the screw shaft 24 (24a–24d) for example mounted on the side plate 20. As the traversers 22a–22d are supported by the same guide shafts 21, a holding area W2 in which the traversers 22a to 22d can stay is provided on at least one side, preferably each side of the winding area W1. The capacity of the holding area W2 is set at least the number of all the traversers minus one. Thus, each of the traversers 22a to 22d can move across the entire width of the winding area W1 by the operation of the motor M.

Figure 8:
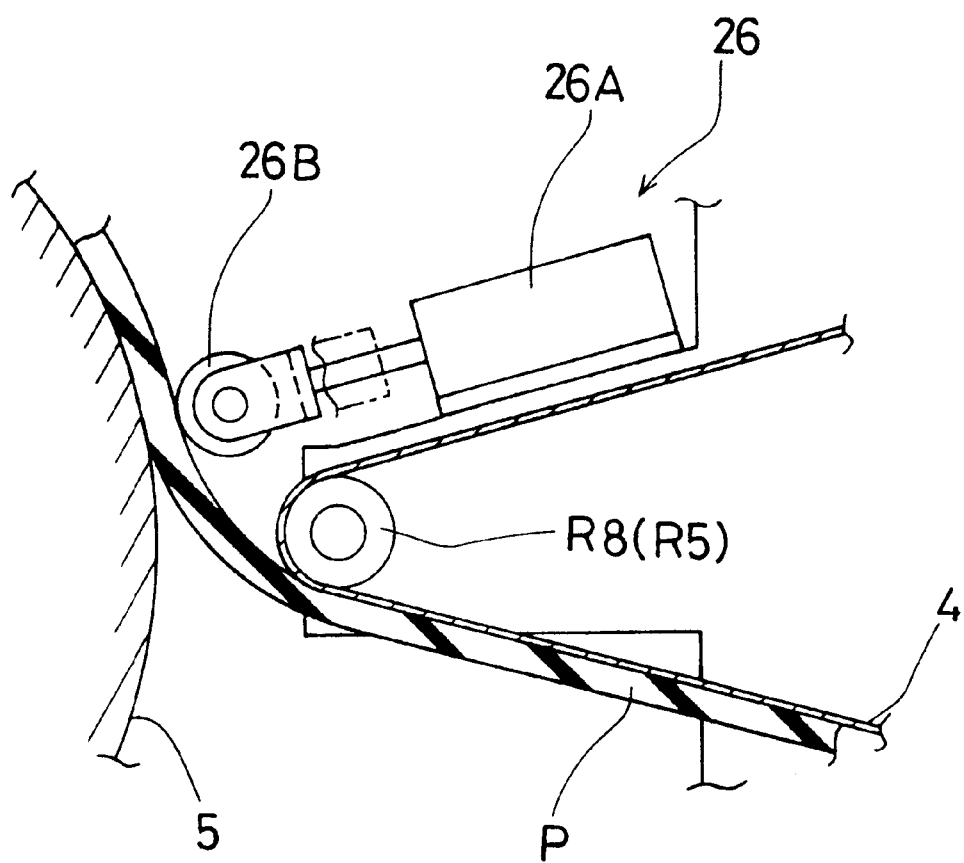
FIG. 8 is a schematic side view for explaining a sticking means for the unvulcanized rubber tape.

Each traverser 22 is provided with a front-end roller R8, around which the conveyor belt 4 coming out from the accumulators 10A and 10B loops, and from which the rubber tape P is released towards the winding drum 5. The front-end roller R8 has a relatively small diameter such that, when the conveyor belt turns therearound, the rubber tape P does not accompany the conveyor belt 4 due to it own rigidity, and thus separates therefrom by oneself. It is however also possible to provide a substantial separating means. In the example shown in FIGS. 3 and 8, the front-end roller R8 is a drive roller R5 which can move the conveyor belt 4 synchronously with the rotation of the drum 5. In FIG. 8, the rubber tape P is released from the downside of the front-end roller R8, but it is also possible to construct the traverser 22 such that the rubber tape P is released from the upside of the front-end roller R8.

Further, each traverser 22 is provided with a sticking means 26 for pressing the rubber tape. P onto the surface of the winding drum 5 or previously wound materials. The sticking means 26 comprises a reciprocating means 26A mounted on the traverser 22 and having a rod which can protrude towards the winding drum 5, and a pressing roller 26B which is a free roller disposed at the tip of the rod. The surface of the pressing roller 26B is smooth and coated with a synthetic resin to which the unvulcanized rubber is hard to adhere. Thus, the pressing roller 26B can smooth the reverse side of the rubber tape P even if roughed when separating from the conveyor belt 4.

Furthermore, a tape cutter 40 which can cut the rubber tape P during transporting is provided downstream of the accumulator section 10, for example provided on each traverser 22. The tape cutter 40 comprises a moving blade 42 which can move at the same blade velocity as the transporting speed of the rubber tape P and a pusher which relatively pushes the rubber tape P towards the moving blade 42. In the example shown in FIG. 10A and FIG. 10B, the pusher comprises an actuator 43 such as pressure cylinder and the like and a pushing plate 41 fixed to a rod of the actuator 43. The moving blade 42 is a rotary blade rotated by a motor 44. When cutting the rubber tape P, by the operation of the actuator 43, the pushing plate 41 pushes the reverse side S2 of the conveyor belt 4 to a position where the moving blade 42 reaches to the right side S1 of the conveyor belt 4. At the same time, the rotary blade 42 is rotated such that the relative speed between the blade velocity and the transporting speed becomes zero. Thus, the rubber tape P can be cut during moving.

In order to prevent the rubber tape P on the conveyor belt 4 from moving or slipping out of position, the conveyor belt 4 is preferably decreased in the total length of parts in which the widthwise direction of the conveyor belt 4 is not parallel with the horizontal direction. Thus, in the above-mentioned accumulator section 10 and rubber-tape receiving section 9, the conveyor belt 4 winds such that the widthwise direction becomes parallel with the horizontal direction. In the traverser section 11, the widthwise direction of the conveyor belt 4 is usually horizontal although it may be inclined when the rubber tape P must be wound around the drum with a relatively large inclination angle.

The above-mentioned swing section 8 is provided between the traverser section 11 and the accumulator section 10.

In the swing section 8, the conveyor belt 4 is once twisted (about 90 degrees) near the accumulator section 10 so that the widthwise direction becomes at a right angle with respect to the traversing direction, and again the conveyor belt 4 is twisted (about 90 degrees) near the traverser section 11 so that the widthwise direction becomes horizontal. Thereby, the conveyor belt 4 enters and goes out the swing section 8 with maintaining the widthwise direction horizontal on both the traverser side and the accumulator side.

In order to twist as above, the swing section 8 includes two sets of twisting rollers (R6 and R6') abd (R7 and R7'), each set including: a pair of substantially orthogonal rollers 81 including a vertical roller R7 and a horizontal roller R7' mounted on the traverser 22; and a pair of substantially orthogonal rollers including a vertical roller R6 and a horizontal roller R6' mounted on the main frame 12 of the accumulator, wherein the widthwise direction of the conveyor belt 4 between the vertical roller R6 and R7 is right angles to the traversing direction or horizontal direction. With respect to the traversing direction, the vertical roller R6 on the accumulator side is disposed outside the winding area W1 and the conveyor belt 4 runs on the outside of the vertical roller R6, whereby the traverser 22 can move across the entire width of the winding area W1. By providing the swing section 8, it becomes possible to increase the inclination angle of the conveyor belt 4 during traversing. As a result, the distance Y between the accumulator section and the traverser section can be shortened, and a plurality of traversers 22 can be arranged in a narrow space near the winding drum 5.

It is not always necessary but preferable to prevent the rubber tape P on the conveyor belt 4 from contacting with the various rollers R. Therefore, in this embodiment, the conveyor belt 4 is twisted between adjacent rollers R if necessary. For example, in the above-mentioned rubber-tape accumulator 10A, the conveyor belt 4 is twisted 180 degrees between the upper guide rollers R1U and the lower guide rollers R1L. On the other hand, it is not always necessary to twist a return portion of the conveyor belt 4 on which the rubber tape P does not exist. But in order to prevent the rollers R from being stained with fragments of unvulcanized rubber, the conveyor belt is preferably twisted in the same manner as above. Therefore, in the conveyor-belt accumulator 10B in this embodiment, the conveyor belt 4 is also twisted 180 degrees between the upper guide rollers R2U and the lower guide rollers R2L. Further, various parts, for example between the drive roller R4 and the first guide roller R1U of the rubber-tape accumulator 10A are twisted. Accordingly, only the reverse side S2 of the conveyor belt 4 contacts with the rollers R.

In the traverser section 11, it is not always necessary to support all the traversers 22a–22d by the same guide shafts 21.

Figure 9:
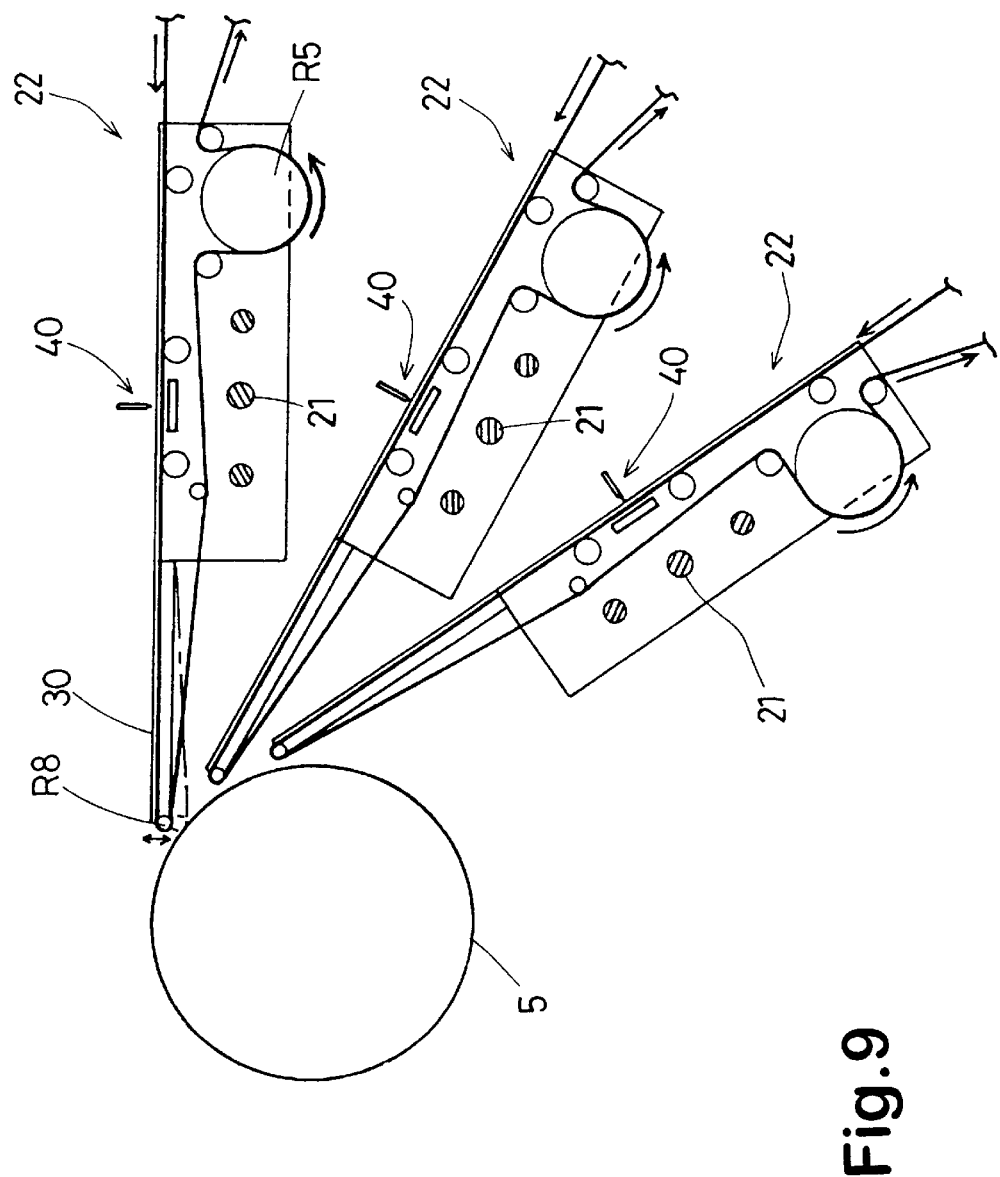
FIG. 9 is a schematic side view showing another example of the traverser.

In FIG. 9, each traverser 22 is supported individually by parallel guide shafts 21. In this case, the traversers 22 are located circumferentially different positions around the axis of the drum 5 so that the traversers 22 can move without coming into collision with each other. Thus, the freedom of traversers' movements is greatly increased.

FIG. 9 further shows another example of the traverser 22, wherein a front-end roller R8 thereof is mounted on a frame 30 which can lean towards the winding drum 5, and a driving roller R5 is separately provided downstream of the front-end roller R8. Thus, by the rotation of the driving roller R5, the conveyor belt 4 is pulled, and by the tension thereof, the frame 30 leans such that the front-end roller R8 contacts with the winding drum 5. Thus, it is possible to apply the rubber tape P onto the winding drum 5. Thus, the front-end roller R8 also has the function of the above-mentioned pressing roller 26B, and the pressing roller 26B is omitted.

The apparatus 1 further comprises a controller including a programable computer, which controls the above-mentioned various actuators, motors, cylinders and the like according to a stored program and output data of various speed detectors and sensors wihch are connected with the computer:

- to rotate the drive roller R4 in each rubber-tape receiving section 9 to move the conveyor belt 4;
- to rotate the compression rollers 7U and 7L;
- to rotate the screw in each extruder 6;
- to move each receive roller R3 to approach to the compression roller 7L;
- to move the receive roller R3 to depart from the compression roller 7L when the coming out of the rubber tape P and the receiving thereof are detected by sensors;
- to rotate the driving rollers R5 until the rubber tape P comes to the front-end roller R8;
- to move the traversers 22 (22a–22d) so that ends of the rubber tapes position on the predetermined wind-starting positions;
- to rotate the winding drum 5 to wind the rubber tapes P therearound while moving the traversers 22 (22a–22d) at predetermined variable speeds and directions so that each of the rubber tapes is wound into a target cross sectional shape;
- to move the movable frame member 13A in the accumulator section 10 according to the difference between the supply and demand;
- to cut the rubber tapes P and stop the driving rollers R5 when the counted number of windings and the detected thickness of the windings reach to preset values.

In case of the pneumatic tire T shown in FIG. 11A, on a cylindrical surface of the drum 5, a thin inner liner rubber Ga is formed in the center of the drum 5, and a chafer rubber Gc is formed on each side of the inner liner rubber Ga, and a sidewall rubber Gb is formed on the axially outside of each chafer rubber Gc. Then, a carcass ply A1 is wound thereon. Further, on the wound carcass ply A1, a breaker cushion rubber Gd is formed on each side the center thereof (tire equator). These rubber component parts Ga, Gb, Gc and Gd are made by winding the unvulcanized rubber tapes Pa, Pb, Pc and Pd under such condition that the drum 5 contracts. Next, by expanding the drum 5, the wound materials are shaped into a toroidal shape; an annular assembly of a bead core A3 and bead apex rubber Gf is set on each side thereof; an annular assembly of a belt A2 and tread rubber Ge is set around the crown portion of the carcass A1; the edges of the carcass are turned up around the bead cores A3 together with the chafer rubber Gc and sidewall rubber Gb; and thereby a raw tire is formed. And lastly the raw tire is put in a mold and vulcanized.

When the rubber tapes P are not wound around the drum 5 to carry out other operations, the conveyor belt 4 is stopped in the traverser section 11 and swing section 8. However, in the accumulator section 10, by the rotation of the drive roller R4, the conveyor belt 4 continuously moves at a substantially constant speed V1 from the conveyor-belt accumulator 10B to the rubber-tape accumulator 10A through the receiving section 9 to accumulate the rubber tape P. When the tape winding is restarted, as the rubber-tape P is accumulated in the rubber-tape accumulator 10A, the drive roller R5 is rotated at a speed V2 faster than the drive roller R4 but equal to the winding drum 5 to make the rubber component parts again as explained above.

In general, a rubber component part formed by winding a rubber tape around a drum is liable to contract when detached from the drum if the tape has a latent tension. Therefore, the transporting speed V1 of the conveyor belt 4 when receiving the tape P is controlled to become somewhat slower than (usually in a range between 0.8 and 1.0 times) the outgoing speed V0 of the rubber tape P from the tape maker 3. Thereby, a latent tension can be completely eliminated from the rubber tape P in a free portion K prepared between the tape maker 3 and conveyor 2. On the other hand, the drive roller R5 is rotated synchronously with the rotation of the winding drum 5, and the speed V2 thereof is the substantially same as the circumferential velocity Vf of the winding drum 5. Thus, the contraction can be prevented. But, if necessary, the speed V2 may be varied within the range of from −2% to +3% of the speed Vf.

Further, the above-mentioned apparatus 1 may be provide with a belt-forming drum in addition to the above-mentioned the tire building drum 5. The tire building drum 5 has a profiled surface corresponding to the carcass profile of the finished tire, around which belt cord plies are wound and further a rubber tape P is wound thereon to form the above-mentoned tread rubber and belt assembly.

The present invention can be applied to a method and apparatus for manufacturing various rubber components in addition to the tire component parts.

What is claimed is:

1. An apparatus for making rubber component parts comprising:
    at least one tape maker for making an unvulcanized rubber tape,
    each of said at least one tape maker comprising an extruder for extruding unvulcanized rubber and a pair of compression rollers between which the extruded unvulcanized rubber passes to shape it into the unvulcanized rubber tape, a winding drum around which said unvulcanized rubber tape is wound into a rubber component part, at least one conveyor for conveying said unvulcanized rubber tape toward said winding drum, each of said at least one conveyor comprising a conveyor belt winding around rollers and having a right side which said unvulcanized rubber tape contacts and a reverse side, and at least one traverser for moving said conveyor belt in the axial direction of the winding drum, said conveyor belt looping between a position in which the conveyor belt receives the unvulcanized rubber tape from the compression rollers of the tape maker and a position adjacent said winding drum from which the unvulcanized rubber tape on the conveyor belt is released towards the winding drum; and means to move said conveyor belt from a position wherein said conveyor belt is in substantial contact with one of said compression rollers of the tape maker for receipt of said tape to a position spaced from said compression rollers.

2. The apparatus for making rubber component parts according to claim 1, wherein the right side of the conveyor belt is coated with a synthetic resin so that the unvulcanized rubber tape can be secured thereon by its self-bonding property during conveying, but does not stick thereto so as to be able to take it off therefrom when winding around the winding drum.

3. The apparatus for making rubber component parts according to claim 2, wherein said synthetic resin is polyurethane.

4. The apparatus for making rubber component parts according to claim 1, wherein each of said at least one conveyor has an accumulator section in which the conveyor belt meanders for accumulating the unvulcanized rubber tape coming out from the tape maker, and said accumulator section having a variable capacity.

5. The apparatus for making rubber component parts according to claim 4, wherein each of said at least one conveyor has a swing section between said accumulator section and the traverser, in which the conveyor belt is twisted so that the widthwise direction of the conveyor belt is substantially at a right angle with respect to the traversing direction of the traverser.

6. The apparatus for making rubber component parts according to claim 1, wherein said conveyor belt is twisted so that the unvulcanized rubber tape on the right side thereof does not contact with rollers, but the reverse side contacts with the rollers.

7. The apparatus for making rubber component parts according to claim 1, wherein between the tape maker and a portion of the conveyor belt receiving the rubber tape coming out from the tape maker, there is a certain space to allow the rubber tape to expand or contract by its internal stress, and a transporting speed of the conveyor belt in said portion when receiving the rubber tape and a speed of the rubber tape coming out from the tape maker are differed from each other so as to eliminate a latent stress from the rubber tape.

8. The apparatus for making rubber component parts according to claim 1, wherein a cutting means is further provided for each of said at least one conveyor, the cutting means comprising a cutting blade which can move at a relative speed of zero to the rubber tape on the conveyor belt so as to cut the rubber tape during transporting.

9. An apparatus for making rubber tires including the apparatus for making rubber component parts according to claim 1, wherein the number of said at least one tape maker, the number of said at least one conveyor and the number of said at least one traverser are the same plural number, and said winding drum is a single drum which can expand such that its surface around which the rubber tapes are wound can changes from a cylindrical profile to a predetermined profile.

10. The apparatus for making rubber component parts according to claim 1, wherein each conveyor comprises a rubber tape-receiving section for receiving the unvulcanized rubber tape from the tape maker;

an accumulator section wherein the conveyor belt meanders;

a traverser section wherein the conveyor belt is moved by the traverser; and a swing section between the accumulator section and traverser section wherein the conveyor belt is twisted so that the widthwise direction thereof becomes generally crosswise to the traversing section.

11. The apparatus for making rubber component parts according to claim 10, wherein the accumulator section includes a rubber tape accumulator for the unvulcanized rubber tape and a conveyor belt accumulator for the conveyor belt returning from the winding drum.

12. The apparatus for making rubber component parts according to claim 10, wherein in the swing section, the conveyor belt is once twisted about 90 degrees near the accumulator section so that the widthwise direction of the conveyor belt is oriented at a right angle with respect to the traversing direction, and again the conveyor belt is twisted about 90 degrees near the traverser section so that the widthwise direction of the conveyor belt becomes horizontal, whereby the conveyor belt enters and exits the swing section while maintaining the widthwise direction horizontal on both the traverser side and the accumulator side.

13. The apparatus for making rubber component parts according to claim 10, wherein said traverser is provided with a front-end roller, around which the conveyor belt exits from the accumulator section, and from which the unvulcanized rubber tape is released towards the winding drum.

14. The apparatus for making rubber component parts according to claim 13, wherein the front end roller has a small diameter so that, when the conveyor belt passes therearound, the unvulcanized rubber tape separates from the conveyor belt.

15. The apparatus for making rubber component parts according to claim 14, wherein the front end roller is a drive roller for driving the conveyor belt synchronously with the rotation of the winding drum.

16. The apparatus for making rubber component parts according to claim 10, wherein said traverser is provided with sticking means including a pressing roller for pressing the unvulcanized rubber tape onto the winding drum or a previously wound material.

17. The apparatus for making rubber component parts according to claim 10, wherein said traverser is provided with a front end roller mounted on a frame capable of moving towards the winding drum, and a driving roller positioned downstream of the front end roller, whereby the frame moves toward the winding drum as a result of tension of the conveyor belt when the driving roller rotates, and the front end roller moves toward the winding drum.

* * * * *